US012670834B2

(12) United States Patent
Kim et al.

(10) Patent No.: US 12,670,834 B2
(45) Date of Patent: Jun. 30, 2026

(54) DISPLAY DEVICE PERFORMING IMAGE STICKING COMPENSATION, METHOD OF COMPENSATING FOR IMAGE STICKING OF A DISPLAY DEVICE, AND ELECTRONIC DEVICE INCLUDING THE DISPLAY DEVICE

(71) Applicant: SAMSUNG DISPLAY CO., LTD., Yongin-si (KR)

(72) Inventors: Hyungjin Kim, Yongin-si (KR); Gigeun Kim, Yongin-si (KR); Kyungsu Lee, Yongin-si (KR); Seokha Hong, Yongin-si (KR)

(73) Assignee: SAMSUNG DISPLAY CO., LTD., Yongin-Si (KR)

( * ) Notice: Subject to any disclaimer, the term of this patent is extended or adjusted under 35 U.S.C. 154(b) by 0 days.

(21) Appl. No.: 18/947,201

(22) Filed: Nov. 14, 2024

(65) Prior Publication Data

US 2025/0191518 A1 Jun. 12, 2025

(30) Foreign Application Priority Data

Dec. 6, 2023 (KR) ........................ 10-2023-0175474

(51) Int. Cl.
*G09G 3/20* (2006.01)

(52) U.S. Cl.
CPC ... *G09G 3/2092* (2013.01); *G09G 2300/0819* (2013.01); *G09G 2310/027* (2013.01); *G09G 2320/0285* (2013.01); *G09G 2320/046* (2013.01); *G09G 2360/16* (2013.01)

(58) Field of Classification Search
None
See application file for complete search history.

(56) References Cited

U.S. PATENT DOCUMENTS 7,675,492 B2 3/2010 Park et al.
2011/0050747 A1* 3/2011 Ishii ..................... G09G 3/3208 345/690
2014/0168039 A1* 6/2014 Kim ..................... G09G 3/3208 345/82
2018/0151117 A1* 5/2018 Choi ..................... G09G 3/3225
2019/0122627 A1* 4/2019 Kim ..................... G09G 3/3611
(Continued)

*Primary Examiner* — Donna V Bocar
(74) *Attorney, Agent, or Firm* — F. CHAU & ASSOCIATES, LLC

(57) ABSTRACT

A display device including: a display panel; an accumulator that generates accumulated stress values of pixels; a memory that stores the accumulated stress values; a lookup table that stores a reference accumulated stress value and a corresponding reference compensation value; a compensator that generates compensation values of the pixels, and generates a data signal based on the input image data and the compensation values of the pixels; and a data driver that converts the data signal into a data voltage, wherein when the input image data is single grayscale data where each of the pixels has the same grayscale, the compensator extracts a minimum reference compensation value from reference compensation values of the pixels, calculates a value, by subtracting a minimum reference accumulated stress value, which corresponds to the minimum reference compensation value from the accumulated stress values of the pixels, and stores the value in the memory.

21 Claims, 11 Drawing Sheets

| CV_REF | ASV_REF | GCV |
|---|---|---|
| 1 | 10 | 0 |
| 2 | 27 | |
| 3 | 51 | |
| 4 | 82 | |
| 5 | 120 | |
| 6 | 165 | |
| 7 | 217 | |
| 8 | 276 | |
| 9 | 342 | |
| 10 | 414 | |
| 11 | 493 | |
| 12 | 579 | |
| 13 | 672 | |
| 14 | 772 | |
| 15 | 879 | |
| 16 | 993 | |
| 17 | 1114 | |
| 18 | 1242 | |
| 19 | 1377 | |
| 20 | 1519 | |

⇨

700

| CV_REF | ASV_REF | GCV |
|---|---|---|
| 1 | 31 | 3(=0+3) |
| 2 | 69 | |
| 3 | 114 | |
| 4 | 166 | |
| 5 | 225 | |
| 6 | 291 | |
| 7 | 363 | |
| 8 | 442 | |
| 9 | 528 | |
| 10 | 621 | |
| 11 | 721 | |
| 12 | 828 | |
| 13 | 942 | |
| 14 | 1063 | |
| 15 | 1191 | |
| 16 | 1326 | |
| 17 | 1468 | |
| 18 | 1616 | |
| 19 | 1771 | |
| 20 | 1933 | |

(56) References Cited

U.S. PATENT DOCUMENTS

| | | | | |
|---|---|---|---|---|
| 2022/0044619 | A1* | 2/2022 | Sohn | G09G 3/20 |
| 2022/0059029 | A1* | 2/2022 | Kishimoto | H04N 5/66 |
| 2023/0136688 | A1* | 5/2023 | Leerentveld | G09G 3/3233<br>345/207 |

* cited by examiner

FIG. 5

700

| CV_REF | ASV_REF |
|---|---|
| 1 | 10 |
| 2 | 27 |
| 3 | 51 |
| 4 | 82 |
| 5 | 120 |
| 6 | 165 |
| 7 | 217 |
| 8 | 276 |
| 9 | 342 |
| 10 | 414 |
| 11 | 493 |
| 12 | 579 |
| 13 | 672 |
| 14 | 772 |
| 15 | 879 |
| 16 | 993 |
| 17 | 1114 |
| 18 | 1242 |
| 19 | 1377 |
| 20 | 1519 |

FIG. 6

| | ASV | ASV_REF | CV_REF |
|---|---|---|---|
| P1 | 53 | 51 | 3 |
| P2 | 83 | 82 | 4 |

⇨

| CV_MIN | ASV_MIN |
|---|---|
| 3 | 51 |

FIG. 7

700

| CV_REF | ASV_REF | GCV |
|---|---|---|
| 1 | 10 | 0 |
| 2 | 27 | |
| 3 | 51 | |
| 4 | 82 | |
| 5 | 120 | |
| 6 | 165 | |
| 7 | 217 | |
| 8 | 276 | |
| 9 | 342 | |
| 10 | 414 | |
| 11 | 493 | |
| 12 | 579 | |
| 13 | 672 | |
| 14 | 772 | |
| 15 | 879 | |
| 16 | 993 | |
| 17 | 1114 | |
| 18 | 1242 | |
| 19 | 1377 | |
| 20 | 1519 | |

⇨

| CV_REF | ASV_REF | GCV |
|---|---|---|
| 1 | 31 | 3(=0+3) |
| 2 | 69 | |
| 3 | 114 | |
| 4 | 166 | |
| 5 | 225 | |
| 6 | 291 | |
| 7 | 363 | |
| 8 | 442 | |
| 9 | 528 | |
| 10 | 621 | |
| 11 | 721 | |
| 12 | 828 | |
| 13 | 942 | |
| 14 | 1063 | |
| 15 | 1191 | |
| 16 | 1326 | |
| 17 | 1468 | |
| 18 | 1616 | |
| 19 | 1771 | |
| 20 | 1933 | |

FIG. 10

700'

| CV_REF | ASV_REF |
|---|---|
| 1 | 10 |
| 2 | 20 |
| 3 | 30 |
| 4 | 40 |
| 5 | 50 |
| 6 | 60 |
| 7 | 70 |
| 8 | 80 |
| 9 | 90 |
| 10 | 100 |
| 11 | 110 |
| 12 | 120 |
| 13 | 130 |
| 14 | 140 |
| 15 | 150 |
| 16 | 160 |
| 17 | 170 |
| 18 | 180 |
| 19 | 190 |
| 20 | 200 |

DISPLAY DEVICE PERFORMING IMAGE STICKING COMPENSATION, METHOD OF COMPENSATING FOR IMAGE STICKING OF A DISPLAY DEVICE, AND ELECTRONIC DEVICE INCLUDING THE DISPLAY DEVICE

This application claims priority under 35 U.S.C. § 119 to Korean Patent Application No. 10-2023-0175474 filed on Dec. 6, 2023 in the Korean Intellectual Property Office (KIPO), the disclosure of which is incorporated by reference herein in its entirety.

TECHNICAL FIELD

Embodiments of the present inventive concept relate to a display device. More particularly, the present inventive concept relates to a display device that performs image sticking compensation, a method for compensating for image sticking in a display device, and an electronic device including the display device.

DESCRIPTION OF THE RELATED ART

Generally, a display device may include a display panel and a display panel driver. The display panel may include gate lines, data lines, and pixels. The display panel driver may include a gate driver for providing gate signals to the gate lines, a data driver for providing a data voltage to the data lines, and a driving controller for controlling the gate driver and the data driver. Additionally, the display panel driver may include a memory and a lookup table.

Over time, the pixels in a display panel may degrade, leading to visible image sticking. To prevent this, the driving controller can perform image sticking compensation for each pixel. This process involves the driving controller accumulating input image data to calculate an accumulated stress value for the pixels and then generating a compensation value based on this accumulated stress value.

The memory may store the accumulated stress value of the pixels. However, the memory may have a limited capacity. When the accumulated stress value exceeds the memory's capacity, the driving controller may be unable to perform the image sticking compensation for each pixel.

SUMMARY

Embodiments of the present inventive concept provide a display device to reduce an accumulated stress value of pixels stored in a memory.

Embodiments of the present inventive concept provide a method for compensating for image sticking in a display device, aimed at reducing an accumulated stress value of pixels stored in a memory.

Embodiments of the present inventive concept provide an electronic device including the display device.

In an embodiment of the present inventive concept, there is provided a display device including: a display panel including a plurality of pixels; an accumulator configured to accumulate input image data and generate accumulated stress values of the pixels; a memory configured to store the accumulated stress values of the pixels; a lookup table configured to store a reference accumulated stress value and a corresponding reference compensation value; a compensator configured to generate compensation values of the pixels based on the accumulated stress values of the pixels and the lookup table, and to generate a data signal based on the input image data and the compensation values of the pixels; and a data driver configured to convert the data signal into a data voltage and output the data voltage to the display panel, wherein when the input image data is single grayscale data where each of the pixels has the same grayscale, the compensator is configured to extract a minimum reference compensation value from reference compensation values of the pixels, calculate a first value, by subtracting a minimum reference accumulated stress value, which corresponds to the minimum reference compensation value from the accumulated stress values of the pixels, and store the first value in the memory.

When the pixels include a first pixel and a second pixel, and a reference compensation value of the first pixel is less than a reference compensation value of the second pixel, the minimum reference compensation value is the reference compensation value of the first pixel, and the minimum reference accumulated stress value is a reference accumulated stress value corresponding to the reference compensation value of the first pixel.

The compensator is configured to store a second value, which is obtained by subtracting the minimum reference accumulated stress value from an accumulated stress value of the first pixel, in the memory, and to store a third value, which is obtained by subtracting the minimum reference accumulated stress value from an accumulated stress value of the second pixel, in the memory.

The compensator is configured to generate a global compensation value of the lookup table based on the minimum reference compensation value.

The global compensation value increases over time.

The reference accumulated stress value changes nonlinearly based on the reference compensation value.

The compensator is configured to shift the lookup table based on a fourth value obtained by subtracting the minimum reference accumulated stress value from the reference accumulated stress value.

The compensator is configured to shift the lookup table by the minimum reference compensation value.

The reference accumulated stress value changes linearly based on the reference compensation value.

The compensator is configured to generate the compensation values of the pixels based on the accumulated stress values of the pixels stored in the memory, and the reference accumulated stress value, the reference compensation value, and the global compensation value stored in the lookup table.

In an embodiment of the present inventive concept, there is provided a method of compensating for image sticking in a display device, the method including: determining whether input image data is single grayscale data where grayscales of the input image data for respective pixels are the same; extracting a minimum reference compensation value from among reference compensation values of the pixels based on a lookup table that stores a reference accumulated stress value and a corresponding reference compensation value; and storing a first value, which is obtained by subtracting a minimum reference accumulated stress value, which corresponds to the minimum reference compensation value, from the accumulated stress values of the pixels, in a memory.

When the pixels include a first pixel and a second pixel, and a reference compensation value of the first pixel is less than a reference compensation value of the second pixel, the minimum reference compensation value is the reference compensation value of the first pixel, and the minimum reference accumulated stress value is a reference accumulated stress value corresponding to the reference compensation value of the first pixel.

A second value, which is obtained by subtracting the minimum reference accumulated stress value from an accumulated stress value of the first pixel, is stored in the memory, and a third value, which is obtained by subtracting the minimum reference accumulated stress value from an accumulated stress value of the second pixel, is stored in the memory.

The method further includes generating a global compensation value of the lookup table based on the minimum reference compensation value.

The global compensation value increases over time.

The reference accumulated stress value changes nonlinearly based on the reference compensation value.

The method further includes shifting the lookup table based on a fourth value obtained by subtracting the minimum reference accumulated stress value from the reference accumulated stress value.

The lookup table is shifted by the minimum reference compensation value.

The reference accumulated stress value changes linearly based on the reference compensation value.

The method further includes generating the compensation values of the pixels based on the accumulated stress values of the pixels stored in the memory, and the reference accumulated stress value, the reference compensation value, and the global compensation value stored in the lookup table.

In an embodiment of the present inventive concept, there is provided an electronic device including: a display panel including a plurality of pixels; an accumulator configured to accumulate input image data and generate accumulated stress values of the pixels; a memory configured to store the accumulated stress values of the pixels; a lookup table configured to store a reference accumulated stress value and a corresponding reference compensation value; a compensator configured to generate compensation values of the pixels based on the accumulated stress values of the pixels and the lookup table, and to generate a data signal based on the input image data and the compensation values of the pixels; a data driver configured to convert the data signal into a data voltage and output the data voltage to the display panel, wherein when the input image data is single grayscale data where each of the pixels has the same grayscale; and a power supply configured to provide a power to the display panel, the accumulator, the memory, the lookup table, the compensator, and the data driver, the compensator is configured to extract a minimum reference compensation value from reference compensation values of the pixels, calculate a first value, by subtracting a minimum reference accumulated stress value, which corresponds to the minimum reference compensation value from the accumulated stress values of the pixels, and store the first value in the memory.

According to the display device, the method of compensating for image sticking in the display device, and the electronic device, the memory may store a value obtained by subtracting the minimum reference accumulated stress value (corresponding to the single grayscale data that does not affect image sticking of the display panel) from the accumulated stress value of the pixels. Accordingly, even though the memory capacity is limited, the lifespan of the display device may be extended.

BRIEF DESCRIPTION OF THE DRAWINGS

The above and other features of the present inventive concept will become more apparent by describing in detail embodiments thereof with reference to the accompanying drawings, in which:

FIGS. 5 and 6 are diagrams for explaining operations of decreasing the accumulated stress values of the pixels;

FIG. 7 is a diagram for explaining an operation of generating a global compensation value and an operation of shifting the lookup table;

FIG. 10 is a diagram showing a lookup table where a reference accumulated stress value changes linearly according to a reference compensation value;

DETAILED DESCRIPTION OF THE EMBODIMENTS

Hereinafter, embodiments of the present inventive concept will be described in more detail with reference to the accompanying drawings.

Figure 1:
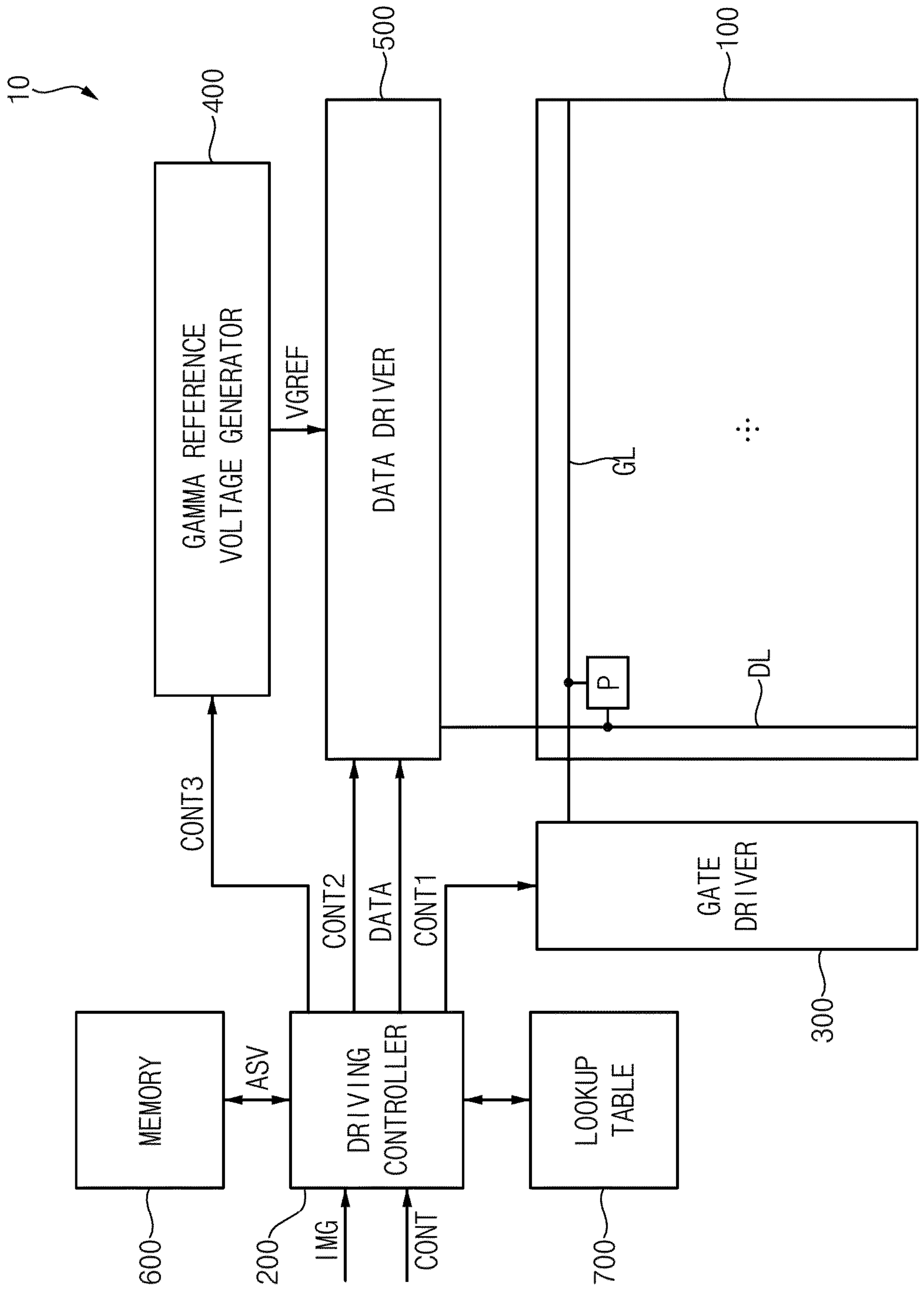
FIG. 1 is a block diagram showing a display device according to embodiments of the present inventive concept.

FIG. 1 is a block diagram showing a display device 10 according to embodiments of the present inventive concept.

Referring to FIG. 1, the display device 10 may include a display panel 100 and a display panel driver. The display panel driver may include a driving controller 200, a gate driver 300, a gamma reference voltage generator 400, and a data driver 500. The display panel driver may further include a memory 600 and a lookup table 700. The components of the display panel driver may each be implemented in hardware in a circuit. For example, the driving controller 200, the gate driver 300, the gamma reference voltage generator 400, the data driver 500, the memory 600 and the lookup table 700 may each be implemented as an electronic circuit.

The display panel 100 may include a display area for displaying an image and a peripheral area disposed adjacent to the display area.

The display panel 100 may include gate lines GL, data lines DL, and pixels P electrically connected to the gate lines GL and the data lines DL, respectively. The gate lines GL may extend in a first direction, and the data lines DL may extend in a second direction crossing the first direction.

The driving controller 200 may receive input image data IMG and an input control signal CONT from an external device. For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, and a data signal DATA based on the input image data IMG and the input control signal CONT.

The driving controller 200 may generate the first control signal CONT1 to control the operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 to control the operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 to control the operation of the gamma reference voltage generator 400 based on the input control signal CONT, and output the third control signal CONT3 to the gamma reference voltage generator 400.

The gate driver 300 may generate gate signals for driving the gate lines GL in response to the first control signal CONT1 received from the driving controller 200. The gate driver 300 may output the gate signals to the gate lines GL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or may be disposed in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into an analog data voltage using the gamma reference voltage VGREF. The data driver 500 may output the data voltage to the data line DL.

The driving controller 200 may accumulate the input image data IMG to generate an accumulated stress value ASV for the pixels P. In an embodiment, the accumulated stress value ASV of the pixels P may be generated on a per-pixel basis. The memory 600 may store the accumulated stress value ASV of the pixels P, which indicates the degradation degree of the pixels P. The memory 600 may be a non-volatile memory, ensuring that the accumulated stress value ASV of the pixels P is retained even when the display device 10 is turned off. In an embodiment, the memory 600 may be implemented as a flash memory, but is not limited to this type.

The lookup table 700 may store a reference accumulated stress value and a corresponding reference compensation value. The driving controller 200 may generate a compensation value for the pixels P based on the accumulated stress value ASV of the pixels P and the lookup table 700. The driving controller 200 may also generate the data signal DATA based on the input image data IMG and the compensation values of the pixels P. Since the lookup table 700 stores preset values considering the characteristics of the display device 10, the driving controller 200 may generate the compensation value for the pixels P based on the accumulated stress value ASV of the pixels P and the lookup table 700 without requiring additional operations.

Figure 2:
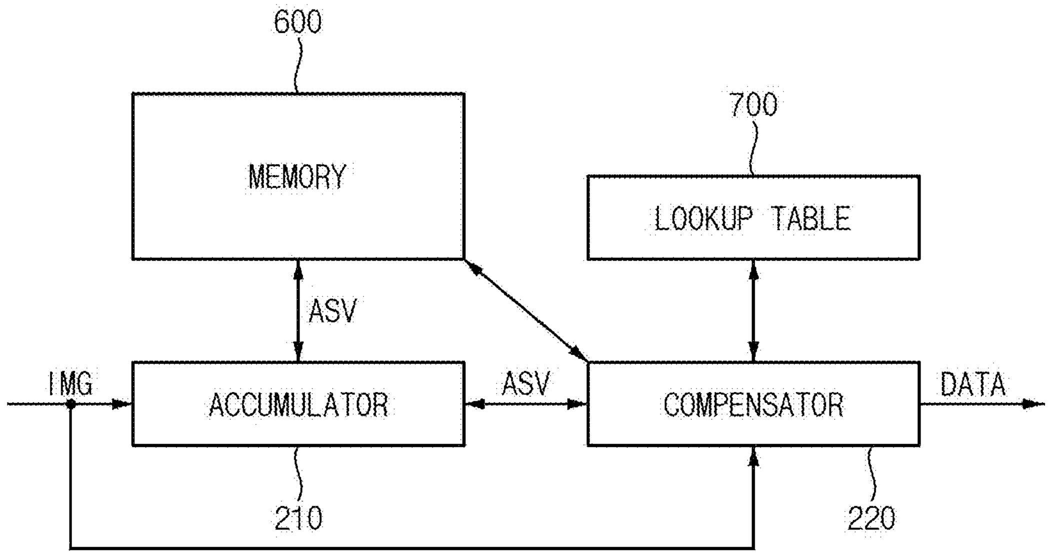
FIG. 2 is a block diagram showing a driving controller, a memory, and a lookup table of FIG. 1.

FIG. 2 is a block diagram showing the driving controller 200, the memory 600, and the lookup table 700 of FIG. 1.

Referring to FIG. 2, the display panel driver may include the driving controller 200, the memory 600, and the lookup table 700. The driving controller 200 may include an accumulator 210 and a compensator 220. The accumulator 210 and the compensator 220 may each be implemented in hardware as a circuit.

The accumulator 210 may accumulate the input image data IMG to generate accumulated stress values ASV for pixels P. The accumulated stress values ASV of the pixels P may be generated on a per-pixel basis. For example, if the pixels P include a first pixel and a second pixel, the accumulated stress values ASV may include an accumulated stress value ASV for the first pixel and an accumulated stress value ASV for the second pixel. The accumulated stress value ASV of the first pixel may indicate the degradation degree of the first pixel, and the accumulated stress value ASV of the second pixel may indicate the degradation degree of the second pixel.

The memory 600 may store the accumulated stress values ASV of the pixels P. For example, if the pixels P include the first pixel and the second pixel, the memory 600 may store the accumulated stress value ASV of the first pixel and the accumulated stress value ASV of the second pixel.

The lookup table 700 may store a reference accumulated stress value and a corresponding reference compensation value. The same lookup table 700 may be applied to all of the pixels P. The lookup table 700 may store preset values that take into account the characteristics of the display device 10.

The compensator 220 may generate compensation values for the pixels P based on their accumulated stress values ASV and the lookup table 700. The compensator 220 may also generate a data signal DATA based on the input image data IMG and the compensation values of the pixels P. For example, if the pixels P include the first pixel and the second pixel, the compensator 220 may generate a data signal DATA for the first pixel by generating a compensation value for the first pixel based on the accumulated stress value ASV of the first pixel and the lookup table 700. Similarly, the compensator 220 may generate a data signal DATA for the second pixel by generating a compensation value for the second pixel based on its accumulated stress value ASV and the lookup table 700.

Figure 3:
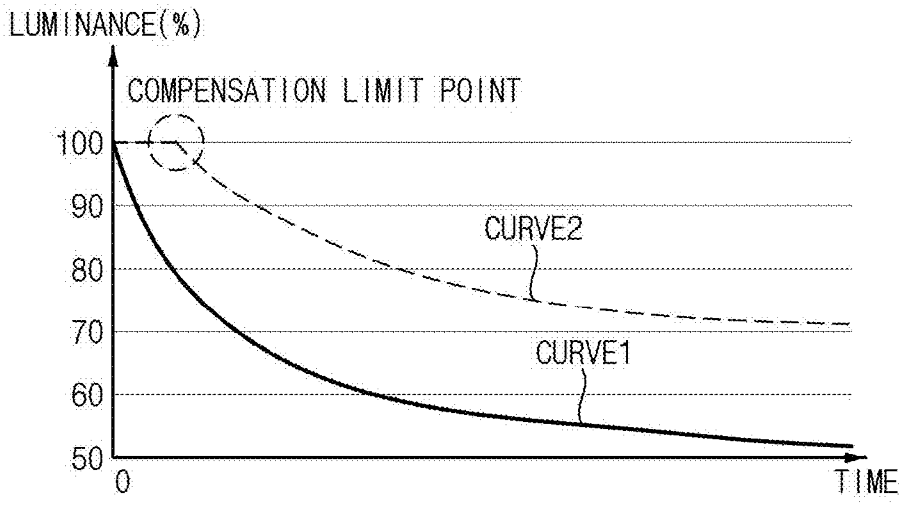
FIG. 3 is a diagram showing a conventional degradation curve.

FIG. 3 is a diagram showing a conventional degradation curve.

Referring to FIG. 3, a first degradation curve CURVE1 represents the degradation of the pixel P when image sticking compensation is not performed. Over time, the pixel P degrades, leading to a decrease in its luminance. At the time of manufacturing the display device 10, the luminance of the pixel P is approximately 100%.

When the luminance of the pixel P is less than a specific value, the display quality of the display device 10 diminishes, signaling the end of its lifespan. For example, the specific value may be 50%. In addition, if the input image data IMG for each pixel P has the same grayscale but the luminance differs due to varying degrees of degradation among the pixels P, image sticking may become noticeable on the display panel 100. Therefore, image sticking compensation is applied to the pixels P.

A second degradation curve CURVE2 represents the degradation of the pixel P when image sticking compensation is performed. To prevent a decrease in the luminance of the pixel P, a compensation value for the pixel P is generated. For example, when the compensation value for the pixel P is generated, the grayscale of the input image data IMG for the pixel P may increase. Therefore, even if the pixel P degrades, the luminance of the pixel P may be maintained at 100%. However, the accumulated stress values ASV of the pixels P increase over time and the memory 600 has a capacity limit. Therefore, image sticking compensation may end when the accumulated stress values ASV of the pixels P is greater than the capacity of the memory 600. In the second degradation curve CURVE2, the endpoint of image sticking compensation may be referred to as a compensation limit point. After this point, the luminance of the pixel P may decrease, though the lifespan of the display device 10 may be extended.

As the compensation limit point is delayed, the lifespan of the display device 10 may be further extended. In other words, extending the compensation limit point further prolongs the lifespan of the display device 10. To delay the compensation limit point, the display device 10 according to the embodiments of the present inventive concept may decrease the accumulated stress values ASV of the pixels P. A detailed description of this process will be provided later.

Figure 4:
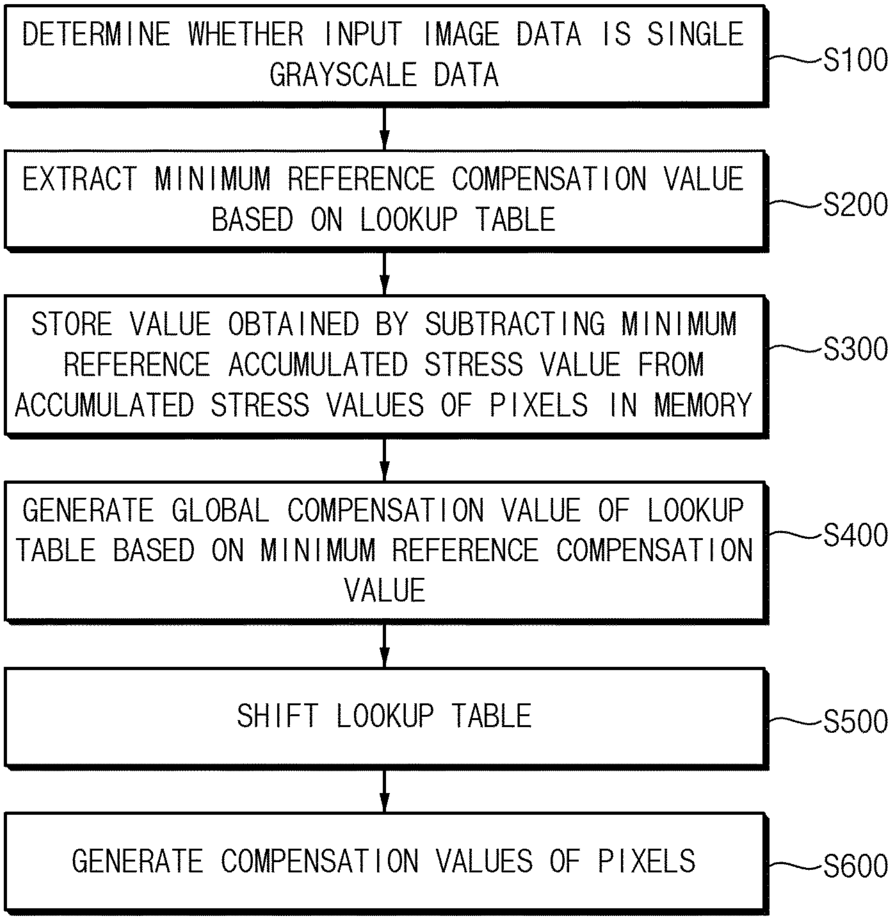
FIG. 4 is a flowchart showing a method of compensating for image sticking in the display device according to the embodiments of the present inventive concept.

FIG. 4 is a flowchart showing a method of compensating for image sticking in the display device 10 according to the embodiments of the present inventive concept. FIGS. 5 and 6 are diagrams for explaining operations of decreasing the accumulated stress values ASV of the pixels P.

Referring to FIGS. 4 to 6, the method of compensating for image sticking in the display device 10 according to the embodiments of the present inventive concept may include: a step S100 of determining whether input image data IMG is single grayscale data by checking if grayscales of respective pixels P are the same; a step S200 of extracting a minimum reference compensation value CV_MIN from reference compensation values CV_REF of the pixels P based on a lookup table 700 that stores a reference accumulated stress value ASV_REF and a corresponding reference compensation value CV_REF; and a step S300 of storing in a memory 600 a value obtained by subtracting a minimum reference accumulated stress value ASV_MIN, which corresponds to the minimum reference compensation value CV_MIN, from the accumulated stress values ASV of the pixels P.

The compensator 220 may receive the input image data IMG. The input image data IMG may include the grayscales of the respective pixels P. The compensator 220 may determine whether the input image data IMG is the single grayscale data.

The single grayscale data refers to data where the grayscales of the input image data IMG for the respective pixels P are the same. When the input image data IMG is single grayscale data, the degradation degrees of the pixels P may be the same, as such this data does not affect image sticking on the display panel 100. As described above, the compensator 220 may determine whether the input image data IMG is the single grayscale data that does not affect image sticking on the display panel 100. For example, when the pixels P include a first pixel P1 and a second pixel P2, and each of a grayscale of the input image data IMG for the first pixel P1 and a grayscale of the input image data IMG for the second pixel P2 is 255, then the input image data IMG is single grayscale data. Similarly, if the grayscale for both the first pixel P1 and the second pixel P2 are 0, the input image data IMG is also single grayscale data. Conversely, if a grayscale for the first pixel P1 is 255 and a grayscale for the second pixel P2 is 0, the input image data IMG is not single grayscale data.

The lookup table 700 may store the reference accumulated stress value ASV_REF and the corresponding reference compensation value CV_REF. For example, the pixels P may include the first pixel P1 and the second pixel P2, the accumulated stress value ASV of the first pixel P1 may be 0, the accumulated stress value ASV of the second pixel P2 may be 30, and each of the accumulated stress value ASV of the first pixel P1 and the accumulated stress value ASV of the second pixel P2 may increase by 53 based on the input image data IMG that is the single grayscale data. In other words, the accumulated stress value ASV of the first pixel P1 may be 53 (=0+53), and the accumulated stress value ASV of the second pixel P2 may be 83 (=30+53). Therefore, according to the lookup table 700 of FIG. 5, the reference compensation value CV_REF of the first pixel P1 corresponding to 53 may be 3, and the reference compensation value CV_REF of the second pixel P2 corresponding to 83 may be 4.

In an embodiment, the reference accumulated stress value ASV_REF may change nonlinearly based on the reference compensation value CV_REF. In another embodiment, the reference accumulated stress value ASV_REF may change linearly based on the reference compensation value CV_REF. FIGS. 5 to 9 illustrate a case where the reference accumulated stress value ASV_REF changes nonlinearly based on the reference compensation value CV_REF. When the reference accumulated stress value ASV_REF changes nonlinearly based on the reference compensation value CV_REF, the degradation curve may also change nonlinearly over time.

The compensator 220 may extract the minimum reference compensation value CV_MIN from among the reference compensation values CV_REF of the pixels P. For example, when the pixels P include the first pixel P1 and the second pixel P2, and the reference compensation value CV_REF of the first pixel P1 is less than the reference compensation value CV_REF of the second pixel P2, the minimum reference compensation value CV_MIN may be the reference compensation value CV_REF of the first pixel P1. For example, when the reference compensation value CV_REF of the first pixel P1 is 3 and the reference compensation value CV_REF of the second pixel P2 is 4, the minimum reference compensation value CV_MIN may be 3 (e.g., a minimum value between 3 and 4).

The compensator 220 may extract the minimum reference accumulated stress value ASV_MIN corresponding to the minimum reference compensation value CV_MIN based on the lookup table 700. The minimum reference accumulated stress value ASV_MIN is the reference accumulated stress value ASV_REF corresponding to the single grayscale data that does not affect image sticking on the display panel 100. For example, if the pixels P include the first pixel P1 and the second pixel P2, and the reference compensation value CV_REF of the first pixel P1 is less than that of the second pixel P2, then the minimum reference accumulated stress value ASV_MIN is the reference accumulated stress value ASV_REF corresponding to the reference compensation value CV_REF of the first pixel P1. For example, if the minimum reference compensation value CV_MIN is 3, the minimum reference accumulated stress value ASV_MIN is 51. Thus, the minimum reference accumulated stress value ASV_MIN of 51 does not affect the image sticking on the display panel 100.

The compensator 220 may store a value in the memory 600, which is obtained by subtracting the minimum reference accumulated stress value ASV_MIN corresponding to the minimum reference compensation value CV_MIN from the accumulated stress values ASV of the pixels P. For example, if the pixels P include the first pixel P1 and the second pixel P2, the compensator 220 may store in the memory 600 a value obtained by subtracting the minimum reference accumulated stress value ASV_MIN from the accumulated stress value ASV of the first pixel P1, and similarly may store a value obtained by subtracting the minimum reference accumulated stress value ASV_MIN from the accumulated stress value ASV of the second pixel P2. For example, when the accumulated stress value ASV of the first pixel P1 is 53, the accumulated stress value ASV of the second pixel P2 is 83, and the minimum reference accumulated stress value ASV_MIN is 51, the compensator 220 may store 2 (=53−51) in the memory 600 as the accumulated stress value ASV of the first pixel P1, and may store 32 (=83−51) in the memory 600 as the accumulated stress value ASV of the second pixel P2.

FIG. 7 is a diagram for explaining an operation of generating a global compensation value GCV and an operation of shifting the lookup table.

Referring to FIGS. 4 to 7, in an embodiment, the method of compensating for image sticking in the display device 10 according to the embodiments of the present inventive concept may further include a step S400 of generating the global compensation value GCV of the lookup table 700 based on the minimum reference compensation value CV_MIN. In an embodiment, the method of compensating for image sticking in the display device 10 according to the embodiments of the present inventive concept may further include a step S500 of shifting the lookup table 700 based on a value obtained by subtracting the minimum reference accumulated stress value ASV_MIN from the reference accumulated stress value ASV_REF.

The compensator 220 may generate the global compensation value GCV of the lookup table 700 based on the minimum reference compensation value CV_MIN. The global compensation value GCV may be a compensation value collectively applied to the pixels P. The compensator 220 may generate the global compensation value GCV based on the minimum reference compensation value CV_MIN. For example, when the minimum reference compensation value CV_MIN is 3 and the global compensation value GCV is 0, the global compensation value GCV may be 3, which is increased by 3 from 0. In other words, the compensation value collectively applied to the pixels P may be 3. Since the degradation degree of the pixels P increases over time, the global compensation value GCV may increase over time.

The compensator 220 may shift the lookup table 700 based on the value obtained by subtracting the minimum reference accumulated stress value ASV_MIN from the reference accumulated stress value ASV_REF. For example, the compensator 220 may shift the lookup table 700 by the minimum reference compensation value CV_MIN.

For example, when the reference accumulated stress value ASV_REF is 10, 27, 51, 82, 120, 165, . . . , the minimum reference accumulated stress value ASV_MIN is 51, and the minimum reference compensation value CV_MIN is 3, the compensator 220 may subtract the minimum reference accumulated stress value ASV_MIN of 51 from the reference accumulated stress value ASV_REF. Therefore, the reference accumulated stress value ASV_REF may be −41, −24, 0, 31, 69, 114, . . . . The compensator 220 may shift the lookup table 700 by the minimum reference compensation value CV_MIN of 3. Therefore, the reference accumulated stress value ASV_REF may be 31, 69, 114, . . . .

Figure 8:
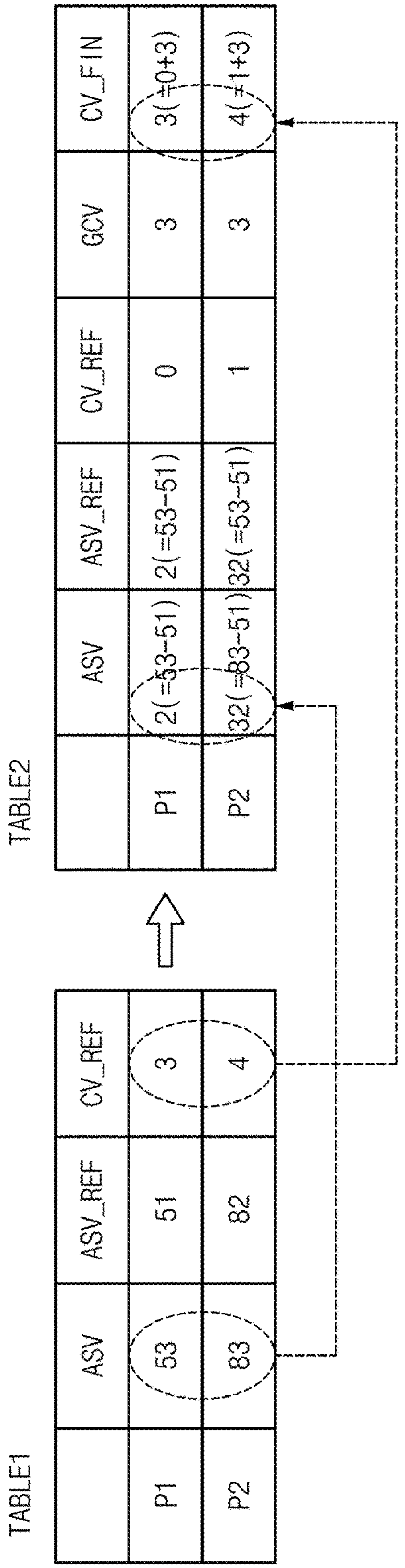
FIG. 8 is a diagram for explaining an operation of generating compensation values of the pixels.

FIG. 8 is a diagram for explaining an operation of generating compensation values CV_FIN of the pixels P.

Referring to FIGS. 4 to 8, in an embodiment, the method of compensating for image sticking in the display device 10 according to the embodiments of the present inventive concept may further include a step S600 of generating the compensation values CV_FIN of the pixels P based on the accumulated stress values ASV of the pixels P stored in the memory 600, and the reference accumulated stress value ASV_REF, the reference compensation value CV_REF, and the global compensation value GCV stored in the lookup table 700.

The compensator 220 may generate the compensation values CV_FIN of the pixels P based on the accumulated stress values ASV of the pixels P and the lookup table 700. For example, the compensator 220 may generate the compensation values CV_FIN of the pixels P based on the accumulated stress values ASV of the pixels P stored in the memory 600, and the reference accumulated stress value ASV_REF, the reference compensation value CV_REF, and the global compensation value GCV stored in the lookup table 700. For example, the pixels P may include the first pixel P1 and the second pixel P2, the accumulated stress value ASV of the first pixel P1 may be 2, the accumulated stress value ASV of the second pixel P2 may be 32, and the global compensation value GCV may be 3. Since the accumulated stress value ASV of the first pixel P1 is 2 less than 31, the reference compensation value CV_REF corresponding to 2 is 0, and the global compensation value GCV is 3, the compensation value CV_FIN of the first pixel P1 may be 3 (=0+3). Since the accumulated stress value ASV of the second pixel P2 is 32, the reference compensation value CV_REF corresponding to 32 is 1, and the global compensation value GCV is 3, the compensation value CV_FIN of the second pixel P2 may be 4 (=1+3).

Table 1 of FIG. 8 illustrates a case where the conventional method of compensating for an after image is applied to the pixels P. Table 2 of FIG. 8 illustrates a case where the method of compensating for image sticking in the display device 10 according to the embodiments of the present inventive concept is applied to the pixels P.

Referring to FIG. 8, when the method of compensating for image sticking in the display device 10 according to the embodiments of the present inventive concept is applied to the pixels P, the compensation value CV_FIN of the first pixel P1 may be the same as 3, and the compensation value CV_FIN of the second pixel P2 may be the same as 4. In contrast, the accumulated stress value ASV of the first pixel P1 may decrease from 53 to 2, and the accumulated stress value ASV of the second pixel P2 may decrease from 83 to 32.

As described above, the display device 10 may store a value in the memory 600, which is obtained by subtracting the minimum reference accumulated stress value ASV_MIN corresponding to the single grayscale data that does not affect image sticking on the display panel 100 from the accumulated stress value ASV of the pixels P. Consequently, even though the memory 600 has a limited capacity, the lifespan of the display device 10 may be extended.

Figure 9:
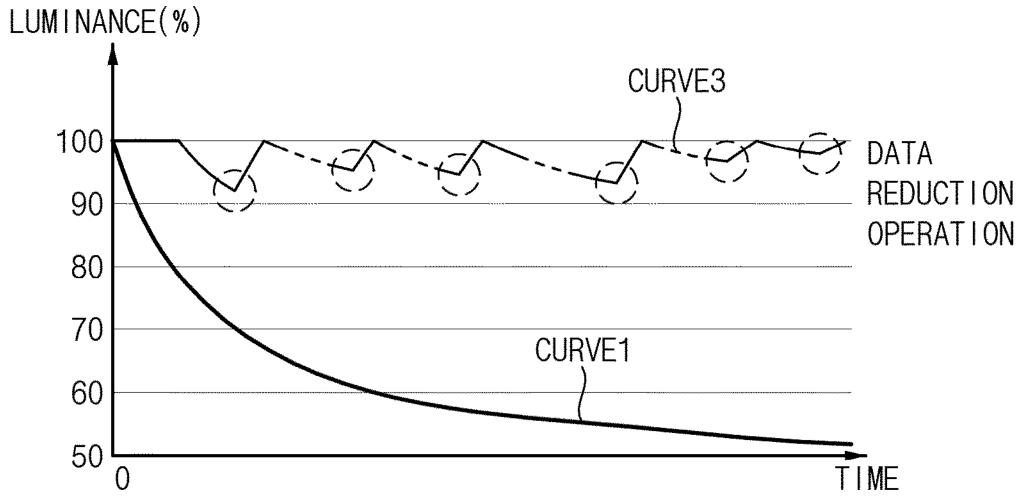
FIG. 9 is a diagram showing a degradation curve to which the method of compensating for image sticking of the display device according to the embodiments of the present inventive concept is applied.

FIG. 9 is a diagram showing a degradation curve to which the method of compensating for image sticking in the display device 10 according to the embodiments of the present inventive concept is applied.

Referring to FIGS. 4 to 9, a first degradation curve CURVE1 may represent the degradation of a pixel P when image sticking compensation is not performed. The pixel P may be degraded over time, resulting in a decrease in its luminance. At the time of manufacturing the display device 10, the luminance of the pixel P may be about 100%.

A third degradation curve CURVE3 may show degradation when the method of compensating for image sticking in the display device 10 according to the embodiments of the present inventive concept is applied. When the accumulated stress values ASV of the pixels P exceed the capacity of the memory 600, the image sticking compensation may cease. To prevent the cessation of image sticking compensation, the method of compensating for image sticking in the display device 10 according to the embodiments of the present inventive concept may maintain the accumulated stress values ASV of the pixels P below the capacity of the memory 600.

Figure 11:
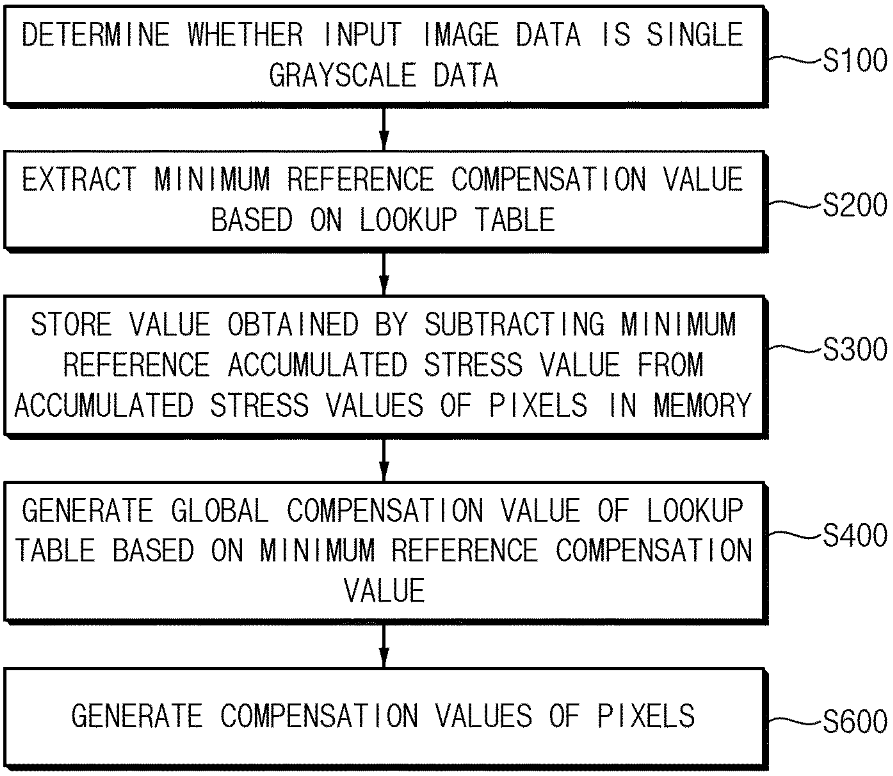
FIG. 11 is a flowchart showing a method of compensating for image sticking in the display device according to the embodiments of the present inventive concept.

FIG. 10 is a diagram showing a lookup table 700' where the reference accumulated stress value ASV_REF changes linearly based on the reference compensation value CV_REF. FIG. 11 is a flowchart showing a method of compensating for image sticking in the display device 10 according to the embodiments of the present inventive concept.

Referring to FIGS. 4 to 11, in an embodiment, the reference accumulated stress value ASV_REF may change linearly based on the reference compensation value CV_REF. When the reference accumulated stress value ASV_REF changes linearly based the reference compensation value CV_REF, the degradation curve also changes linearly over time. For example, as shown in FIG. 10, the reference accumulated stress value ASV_REF may be 10, 20, 30, 40, 50, 60, . . . .

When the reference accumulated stress value ASV_REF changes linearly based on the reference compensation value CV_REF, the method of compensating for image sticking in the display device 10 according to the embodiments of the present inventive concept may include: a step S100 of determining whether input image data IMG is single grayscale data in which grayscales of the input image data IMG of respective pixels P are the same; a step S200 of extracting a minimum reference compensation value CV_MIN from among reference compensation values CV_REF of the pixels P based on a lookup table 700 for storing a reference accumulated stress value ASV_REF and a reference compensation value CV_REF corresponding to the reference accumulated stress value ASV_REF; and a step S300 of storing a value, which is obtained by subtracting a minimum reference accumulated stress value ASV_MIN corresponding to the minimum reference compensation value CV_MIN from the accumulated stress values ASV of the pixels P, in a memory 600.

In an embodiment, the method of compensating for image sticking in the display device 10 according to the embodiments of the present inventive concept may further include a step S400 of generating the global compensation value GCV of the lookup table 700 based on the minimum reference compensation value CV_MIN.

In an embodiment, the method of compensating for image sticking in the display device 10 according to the embodiments of the present inventive concept may further include a step S600 of generating the compensation values CV_FIN of the pixels P based on the accumulated stress values ASV of the pixels P stored in the memory 600, and the reference accumulated stress value ASV_REF, the reference compensation value CV_REF, and the global compensation value GCV stored in the lookup table 700.

In the lookup table 700' where the reference accumulated stress value ASV_REF changes linearly based on the reference compensation value CV_REF, the method of compensating for image sticking in the display device 10 according to the embodiments of the present inventive concept may not further include a step S500 (see FIG. 4) of shifting the lookup table 700' based on a value obtained by subtracting the minimum reference accumulated stress value ASV_MIN from the reference accumulated stress value ASV_REF.

Figure 12:
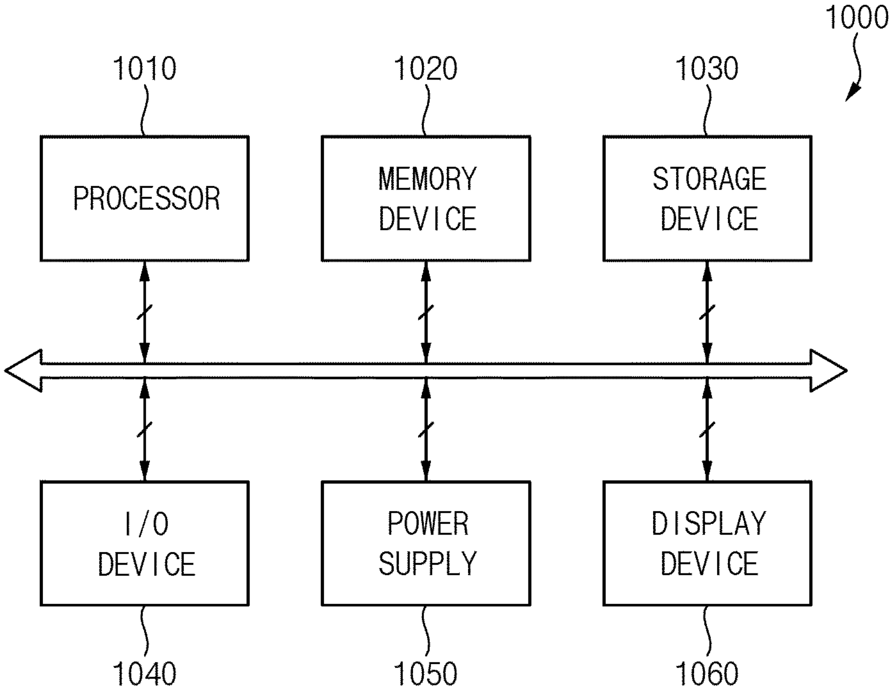
FIG. 12 is a block diagram illustrating an electronic device to which embodiments of the present inventive concept are applied.
Figure 13:
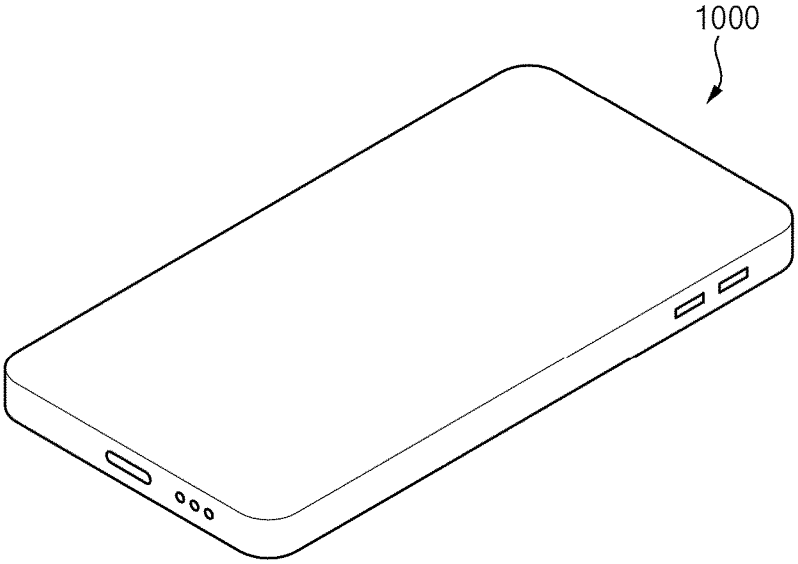
FIG. 13 is a diagram illustrating an embodiment in which the electronic device of FIG. 12 is implemented as a smart phone.

FIG. 12 is a block diagram illustrating an electronic device to which embodiments of the present inventive concept are applied. FIG. 13 is a diagram illustrating an embodiment in which the electronic device of FIG. 12 is implemented as a smart phone.

Referring to FIGS. 12 and 13, the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic devices, and the like.

In an embodiment, as illustrated in FIG. 13, the electronic device 1000 may be implemented as the smart phone. However, the electronic device 1000 is not limited thereto. For example, the electronic device 1000 may be implemented as a cellular phone, a video phone, a smart pad, a smart watch, a tablet personal computer (PC), a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

Embodiments of inventive concept may be applied to any display device and any electronic device including a touch panel. For example, embodiments of the inventive concept may be applied to a mobile phone, a smart phone, a tablet computer, a digital television (TV), a three-dimensional (3D (TV, a PC, a home appliance, a laptop computer, a personal digital assistant (PDA), a portable multimedia player (PMP), a digital camera, a music player, a portable game console, a navigation device, etc.

The foregoing description is illustrative of the inventive concept and should not be construed as limiting. Although a few embodiments of the inventive concept have been described, those skilled in the art will readily appreciate that many modifications can be made to these embodiments without materially departing from the novel teachings of the inventive concept. Accordingly, all such modifications are intended to be included within the scope of the inventive concept as set forth in the claims.

What is claimed is:

1. A display device comprising:

a display panel including pixels;

an accumulator configured to accumulate input image data and generate accumulated stress values of the pixels;

a memory configured to store the accumulated stress values of the pixels;

a lookup table configured to store a reference accumulated stress value and a corresponding reference compensation value;

a compensator configured to generate compensation values of the pixels based on the accumulated stress values of the pixels and the lookup table, and to generate a data signal based on the input image data and the compensation values of the pixels; and a data driver configured to convert the data signal into a data voltage and output the data voltage to the display panel, wherein the compensator is further configured to:

in response to a determination that the input image data is single grayscale data where each of the pixels has the same grayscale, extract a minimum reference compensation value from reference compensation values of the pixels, calculate a first value, by subtracting a minimum reference accumulated stress value, which corresponds in the lookup table to the minimum reference compensation value, from an accumulated stress value of a first pixel of the pixels, store the first value in the memory as an updated accumulated stress value of the first pixel, and shift the lookup table.

2. The display device of claim 1, wherein the pixels further include a second pixel, and when a reference compensation value of the first pixel is less than a reference compensation value of the second pixel, the minimum reference compensation value is the reference compensation value of the first pixel, and the minimum reference accumulated stress value is a reference accumulated stress value corresponding to the reference compensation value of the first pixel.

3. The display device of claim 2, wherein the compensator is configured to store a second value, which is obtained by subtracting the minimum reference accumulated stress value from an accumulated stress value of the first pixel, in the memory, and to store a third value, which is obtained by subtracting the minimum reference accumulated stress value from an accumulated stress value of the second pixel, in the memory.

4. The display device of claim 1, wherein the compensator is configured to generate a global compensation value of the lookup table based on the minimum reference compensation value.

5. The display device of claim 4, wherein the global compensation value increases over time.

6. The display device of claim 4, wherein the reference accumulated stress value changes nonlinearly based on the reference compensation value.

7. The display device of claim 6, wherein the compensator is configured to shift the lookup table based on a fourth value obtained by subtracting the minimum reference accumulated stress value from the reference accumulated stress value.

8. The display device of claim 7, wherein the compensator is configured to shift the lookup table by the minimum reference compensation value.

9. The display device of claim 4, wherein the reference accumulated stress value changes linearly based on the reference compensation value.

10. The display device of claim 4, wherein the compensator is configured to generate the compensation values of the pixels based on the accumulated stress values of the pixels stored in the memory, and the reference accumulated stress value, the reference compensation value, and the global compensation value stored in the lookup table.

11. A method of compensating for image sticking in a display device, the method comprising:

determining whether input image data is single grayscale data where grayscales of the input image data for respective pixels are the same;

in response to determining that the input image data is the single grayscale data, extracting a minimum reference compensation value from among reference compensation values of the pixels based on a lookup table that stores reference accumulated stress values and corresponding reference compensation values;

storing a first value, which is obtained by subtracting a minimum reference accumulated stress value, which corresponds to the minimum reference compensation value, from an accumulated stress value of a first pixel of the pixels, in a memory as an updated accumulated stress value for the first pixel;

compensating for the image sticking using the first value; and shifting the lookup table.

12. The method of claim 11, wherein the pixels further include a second pixel, and when a reference compensation value of the first pixel is less than a reference compensation value of the second pixel, the minimum reference compensation value is the reference compensation value of the first pixel, and the minimum reference accumulated stress value is a reference accumulated stress value corresponding to the reference compensation value of the first pixel.

13. The method of claim 12, wherein a second value, which is obtained by subtracting the minimum reference accumulated stress value from an accumulated stress value of the first pixel, is stored in the memory, and a third value, which is obtained by subtracting the minimum reference accumulated stress value from an accumulated stress value of the second pixel, is stored in the memory.

14. The method of claim 11, further comprising generating a global compensation value of the lookup table based on the minimum reference compensation value.

15. The method of claim 14, wherein the global compensation value increases over time.

16. The method of claim 14, wherein the reference accumulated stress value changes nonlinearly based on the reference compensation value.

17. The method of claim 16, wherein the lookup table is shifted based on a fourth value obtained by subtracting the minimum reference accumulated stress value from the reference accumulated stress value.

18. The method of claim 17, wherein the lookup table is shifted by the minimum reference compensation value.

19. The method of claim 14, wherein the reference accumulated stress value changes linearly based on the reference compensation value.

20. The method of claim 14, further comprising generating the compensation values of the pixels based on the accumulated stress values of the pixels stored in the memory, and the reference accumulated stress value, the reference compensation value, and the global compensation value stored in the lookup table.

21. An electronic device comprising:

a display panel including pixels;

an accumulator configured to accumulate input image data and generate accumulated stress values of the pixels;

a memory configured to store the accumulated stress values of the pixels;

a lookup table configured to store a reference accumulated stress value and a corresponding reference compensation value;

a compensator configured to generate compensation values of the pixels based on the accumulated stress values of the pixels and the lookup table, and to generate a data signal based on the input image data and the compensation values of the pixels;

a data driver configured to convert the data signal into a data voltage and output the data voltage to the display panel; and a power supply configured to provide a power to the display panel, the accumulator, the memory, the lookup table, the compensator, and the data driver, wherein the compensator is further configured to:

in response to a determination that the input image data is single grayscale data where each of the pixels has the same grayscale, extract a minimum reference compensation value from reference compensation values of the pixels, calculate a first value, by subtracting a minimum reference accumulated stress value, which corresponds in the lookup table to the minimum reference compensation value, from an accumulated stress value of a first pixel of the pixels, and store the first value in the memory as an updated accumulated stress value of the first pixel, and shift the lookup table.

* * * * *